United States Patent [19]
Yamada et al.

[11] 4,297,020
[45] Oct. 27, 1981

[54] VIEW FINDER FOR SINGLE-LENS REFLEX CAMERA

[75] Inventors: Yasuyuki Yamada, Tokyo; Youichi Okuno, Yokohama, both of Japan

[73] Assignee: Canon Kabushiki Kaisha, Tokyo, Japan

[21] Appl. No.: 118,799

[22] Filed: Feb. 5, 1980

[30] Foreign Application Priority Data

Feb. 7, 1979 [JP] Japan .................................. 54-12992

[51] Int. Cl.³ ........................ G03B 13/08; G03B 17/20
[52] U.S. Cl. ..................................... 354/225; 354/54; 354/155
[58] Field of Search ............... 354/54, 155, 225, 23 R, 354/59

[56] References Cited
U.S. PATENT DOCUMENTS

| | | | |
|---|---|---|---|
| 3,094,911 | 6/1963 | Reiche et al. | 354/54 |
| 3,840,298 | 10/1974 | Okuno | 354/289 |
| 3,911,457 | 10/1975 | Okuno | 354/54 |
| 3,962,710 | 6/1976 | Okuno et al. | 354/155 |
| 4,021,830 | 5/1977 | Kanno | 354/155 |
| 4,128,321 | 12/1978 | Kobori et al. | 354/155 |
| 4,131,355 | 12/1978 | Kimura et al. | 354/155 |

FOREIGN PATENT DOCUMENTS 1302863 7/1962 France .................................. 354/54

Primary Examiner—Russell E. Adams
Attorney, Agent, or Firm—Toren, McGeady and Stanger

[57] ABSTRACT

A view finder for a single-lens reflex camera has a notch formed in the light exit face of a view finder prism outside of the area through which photographic light rays are passing. At the notch, a reflection member guides rays of light representing photographic data and passing through the inside of the view finder prism toward an eyepiece.

5 Claims, 2 Drawing Figures

VIEW FINDER FOR SINGLE-LENS REFLEX CAMERA

BACKGROUND OF THE INVENTION

1. Field of the Invention

This invention relates to a view finder for a single-lens reflex camera, and more particularly, to a view finder which displays photographic information, such as an aperture value, a distance graduation, a shutter speed, the depth of focus, and the like in a lower part of the visual field.

2. Description of the Prior Art

In known view finders for single-lens reflex cameras having a reflector between the exit face of a pentagonal prism and an eyepiece directors photographic information source toward the eyepiece so as to display photographic information in the lower part of the visual field of the view finder.

However, recent requirements for reduction in size of cameras has prompted removal of the reflector from the space between the exit face of the pentagonal prism and the eyepiece. This space for installation there other components such as electrical circuit elements and the like.

SUMMARY OF THE INVENTION

It is therefore a general object of this invention to provide a view finder for a single-lens reflex camera which reintroduces the hitherto removed reflector into the space between the exit face of a pentagonal prism without the previous drawbacks.

To attain this object, in accordance with the invention, the view finder is arranged with the reflector buried in a ghost cut groove provided in the lower part of the exit face of the pentagonal prism.

The above and further objects, features and advantages of the invention will become apparent from the following detailed description of embodiments thereof taken in connection with the accompanying drawings.

DETAILED DESCRIPTION OF PREFERRED EMBODIMENTS

Figure 1:
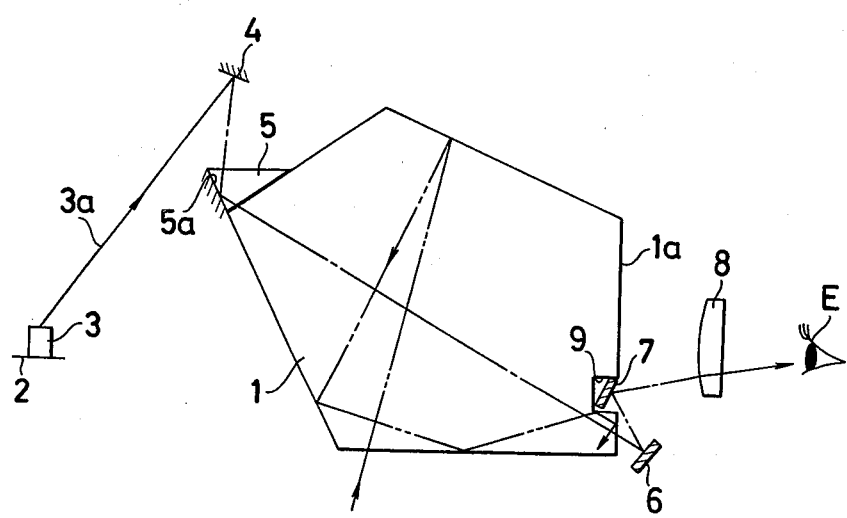
FIG. 1 is a front view schematically showing the structural arrangement of the view finder embodying the invention in a single-lens reflex camera.

In each of the embodiments of the invention shown in the accompanying drawings, a pentagonal roof prism 1 is employed as view finder prism. In FIG. 1, a notch 9 is provided in a light exit face 1a of a pentagonal roof prism 1. The notch 9 is positioned outside of the area that passes rays of light which form an image of the scene being photographed and below the optical axis of an eyepiece 8. A final reflection member 7 of an optical system for photographic information is disposed within the notch 9.

The notch 9 functions to remove ghost light G, which is indicated by a two-dot chain line in the drawing. According to an embodiment of this invention, the notch 9 constitutes a notch which is provided in a conventional pentagonal prism.

Rays of light 3a bearing photographic information 3 and coming from a lens barrel 2 are reflected by a reflection member 4 and a reflection face 5a provided on the front upper face of the pentagonal roof prism 1. The rays pass through the inside of the roof prism 1, and are reflected by reflection members 6 and 7 to strike a lower part of the eyepiece 8. The photographic information is displayed in the lower part of the visual field of the view finder.

Figure 2:
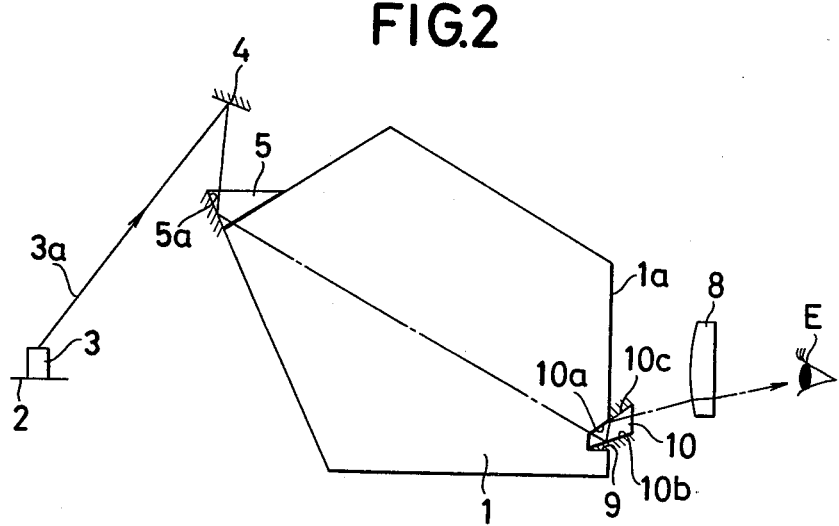
FIG. 2 is a front view showing an example of modification of the view finder arrangement shown in FIG. 1.

In FIG. 2, which shows a modification of embodiment described above, the two reflection members 6 and 7 are replaced by a transmission part or junction 10a, which is formed by cementing a prism 10 to the inside of the notch 9. The rays of light 3a which represent the photographic information coming through the inside of the pentagonal roof prism 1 enter the prism 10 from the transmission part 10a and then are twice reflected by reflection faces 10b and 10c of the prism 10 before they enter the lower part of the eyepiece 8.

With this structural arrangement of the invention, the photographic information is displayed in the lower part of the visual field of the view finder to be read. Besides, the view finder furnishes a comfortable feeling when the operator peers through it because the photographic information optical system does not stand out when the system is viewed through the eyepiece. Further, since the final reflection member of the photographic information optical system is arranged at the notch in the view finder prism, the invented arrangement permits effective utilization of a space between the view finder prism and the eyepiece and thus contributes to reduction in size of a camera.

In accordance with the present invention, the shape of the view finder prism is not limited to the pentagonal roof prism, which is shown in the drawings. Prisms of other various shapes are also usable. Furthermore, the photographic information optical system may be arranged by positioning one reflection member on the entrance side of the pentagonal roof prism and one of three reflection members on the exit side.

What is claimed is:

1. A viewfinder for a single-lens reflex camera, comprising:
   a viewfinder prism having an entrance face for receiving imaging light representing an image of an object to be photographed, an exit face which allows the incident light to exit therethrough and a notch in the lower part of said exit face outside the area thereof through which rays of imaging light pass;
   a photographic data source;
   an optical system for guiding data coming from said photographic data source to the inside of said viewfinder prism and then allows the data light to pass from said exit face of the viewfinder prism;
   a reflection arrangement at least partly disposed in said ghost cut groove, said reflection body being arranged to direct the data light coming from said photographic data source and allowed to pass from said exit face towards an eyepiece.

2. A viewfinder according to claim 1, wherein said reflection arrangement is located between said viewfinder prism and said eyepiece and includes two reflectors on the same side of the optical axis of said eyepiece; one of the two reflectors being disposed in the notch; the reflectors being arranged to reflect rays of light representing photographic data one after another to allow them to enter said eyepiece.

3. A view finder according to claim 2 wherein, of said two reflection members, the final reflection member is disposed closer to the optical axis of said eyepiece than the other reflection member.

4. A viewfinder according to claim 1, wherein the reflection arrangement includes a reflection member having two reflection faces and cemented to said notch.

5. A viewfinder according to claim 4, wherein the reflection member includes a cemented face on which said reflection member is cemented to said notch and the face forms a transmission junction for the rays of light representing photographic information.

* * * * *